US011091209B2

(12) United States Patent
    Nakagawa (10) Patent No.: US 11,091,209 B2
(45) Date of Patent: Aug. 17, 2021

(54) VEHICLE COVER MEMBER

(71) Applicant: Toyota Jidosha Kabushiki Kaisha, Toyota (JP)

(72) Inventor: Takuya Nakagawa, Toki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 16/729,907

(22) Filed: Dec. 30, 2019

(65) Prior Publication Data

US 2020/0223492 A1    Jul. 16, 2020

(30) Foreign Application Priority Data

Jan. 11, 2019    (JP) .............................. JP2019-003227

(51) Int. Cl.
    *B60J 7/00*     (2006.01)
    *B62D 25/20*    (2006.01)

(52) U.S. Cl.
    CPC .................................. *B62D 25/20* (2013.01)

(58) Field of Classification Search
    CPC ..... B60R 22/06; B60R 19/445; B60C 27/045; B60J 10/30; B60J 10/70; B60P 3/08; G07B 15/063; B62D 1/28; G01S 13/931; G01C 21/28
    See application file for complete search history.

(56) References Cited

U.S. PATENT DOCUMENTS

| 5,002,333 | A | * | 3/1991 | Kenmochi | B62D 21/10 |
| | | | | | 296/204 |
| 2005/0082879 | A1 | * | 4/2005 | Goto | B62D 25/2036 |
| | | | | | 296/204 |
| 2008/0258503 | A1 | * | 10/2008 | Egawa | B62D 25/2072 |
| | | | | | 296/193.07 |
| 2010/0187864 | A1 | * | 7/2010 | Tsuchida | B62D 25/20 |
| | | | | | 296/193.07 |
| 2012/0256446 | A1 | * | 10/2012 | Yasuhara | B62D 25/20 |
| | | | | | 296/193.07 |
| 2014/0203595 | A1 | * | 7/2014 | Mochizuki | B62D 25/2027 |
| | | | | | 296/193.07 |
| 2016/0200191 | A1 | * | 7/2016 | Ito | B60K 15/073 |
| | | | | | 280/834 |
| 2018/0072352 | A1 | * | 3/2018 | Shimoda | B60R 16/04 |
| 2018/0215418 | A1 | * | 8/2018 | Hijikata | B62D 25/20 |
| 2019/0072023 | A1 | * | 3/2019 | Kinomoto | B60K 11/08 |
| 2019/0202286 | A1 | * | 7/2019 | Natsume | B60K 17/00 |
| 2019/0291573 | A1 | * | 9/2019 | Banno | B62D 25/20 |

(Continued)

FOREIGN PATENT DOCUMENTS

| DE | 19521632 A1 | 12/1996 |
| JP | 2012-056573 A | 3/2012 |
| JP | 2016-078765 A | 5/2016 |

*Primary Examiner* — Kiran B Patel
(74) *Attorney, Agent, or Firm* — Dinsmore & Shohl LLP (57) ABSTRACT

A tray-like vehicle cover member has a flat bottom plate, an edge wall rising from a peripheral edge of the bottom plate, and a flange that is connected to an upper end portion of the edge wall and provided with a plurality of fastening portions to be fastened to a vehicle. In this vehicle cover member, the bottom plate has an annular groove formed in an intermediate portion between the peripheral edge and the center, and a plurality of radial grooves formed to extend radially from the annular groove toward the fastening portions.

9 Claims, 6 Drawing Sheets

(56) References Cited

U.S. PATENT DOCUMENTS

| | | | |
|---|---|---|---|
| 2019/0291785 A1* | 9/2019 | Nagano | B62D 21/155 |
| 2020/0047818 A1* | 2/2020 | Ebisumoto | B62D 25/20 |
| 2020/0079437 A1* | 3/2020 | Kim | B62D 25/08 |
| 2020/0361541 A1* | 11/2020 | Matsuda | B62D 25/2036 |
| 2021/0070371 A1* | 3/2021 | Ebisumoto | B62D 25/20 |

\* cited by examiner

VEHICLE COVER MEMBER

CROSS REFERENCE TO RELATED APPLICATION

This application claims priority to Japanese Patent Application No. 2019-003227 filed on Jan. 11, 2019, which is incorporated herein by reference in its entirety including the specification, claims, drawings, and abstract.

TECHNICAL FIELD

The present disclosure relates to a structure of a vehicle cover member attached to a vehicle.

BACKGROUND

Vehicle cover members, such as an undercover for covering the underside of an engine compartment of the vehicle front side, have been used in order to protect devices mounted in a vehicle when the vehicle interferes with the road surface and to smooth the flow of air under the vehicle so as to reduce the air resistance (for example, see JP 2016-078765 A).

An undercover disclosed in JP 2016-078765 A ensures its strength by arranging a flange around the periphery thereof and providing beads extending in the vehicle front-and-rear direction on a substrate mounted in a rectangular frame surrounded by the flange.

However, for the prior art undercover disclosed in JP 2016-078765 A, if the vehicle receives inputs from the road surface, stress may be concentrated on the beads extending in the vehicle front-and-rear direction and thus deform the bead portion.

SUMMARY

Accordingly, an object of the present disclosure is to provide a vehicle cover member that can diffuse inputs from the outside surface and prevent stress concentration.

A vehicle cover member according to the present disclosure is a tray like vehicle cover member having a flat bottom plate, an edge wall rising from a peripheral edge of the bottom plate, and a flange that is connected to an upper end portion of the edge wall and provided with a plurality of fastening portions to be fastened to a vehicle, and in this vehicle cover member, the bottom plate has an annular groove formed in an intermediate portion between the peripheral edge and the center, and a plurality of radial grooves formed to extend radially from the annular groove toward the fastening portions.

As such, the radial grooves, the annular groove, and the fastening portions of the flange are connected to thereby form an integrated body structure. Therefore, if the vehicle receives inputs from the outside surface, the inputs are allowed to flow smoothly from the annular groove and the radial grooves to the fastening portions of the flange, whereby stress concentration can be prevented.

In the vehicle cover member according to the present disclosure, the peripheral shape of the bottom plate and the peripheral shape of the flange may be a polygon, and the fastening portions may be provided at corners of the flange. The plane shape of the annular groove may a polygon analogous to the bottom plate, and corners of the plane shape of the annular groove may be arranged to face corners of the bottom plate. The radial grooves may respectively extend radially from the corners of the annular groove toward the corners of the flange at which the fastening portions are provided.

The fastening portions are arranged at the corners of the polygonal flange, and the radial grooves connect the annular groove and the fastening portions, to thereby allow smooth flow of the inputs from the outside surface to the fastening portions.

In the vehicle cover member according to the present disclosure, the peripheral shape of the bottom plate and the peripheral shape of the flange may be a quadrangle, and the fastening portions may be provided at the four corners of the flange. The radial grooves may respectively extend radially from the corners of the annular groove to the four corners of the flange. The length in the width direction between a side end of the bottom plate in the width direction and the annular groove may be equal to the length in the width direction between the annular grooves of the bottom plate. The length, in the longitudinal direction between a side end of the bottom plate in the longitudinal direction and the annular groove may be equal to the length in the longitudinal direction between the annular grooves of the bottom plate.

Thus, the flange around the periphery and the annular groove are arranged substantially uniformly in the vehicle front-and-rear direction and, in the vehicle width direction, and therefore, if the vehicle receives inputs from the outside surface, the inputs can be diffused more effectively, whereby stress concentration can be prevented.

In the vehicle cover member according to the present disclosure, the annular groove and the radial grooves may have a groove-shaped cross-sectional shape recessed upward from the undersurface of the bottom plate. A side wall of the radial groove may be connected to a side wall of the annular groove and the fastening portion of the flange, and a bottom wall of the radial groove may be connected to a bottom wall of the annular groove and the fastening portion of the flange.

As such, the side wall of the radial groove is connected to the side wall of the annular groove and the fastening portion, of the flange, and the bottom wall of the radial groove is connected to the bottom wall of the annular groove and the fastening portion of the flange. The radial grooves, the annular groove, and the fastening portions of the flange thus form an integrated body structure. Therefore, if the vehicle receives inputs from the outside surface, the inputs are allowed to flow smoothly from the annular groove and the radial grooves to the fastening portions of the flange, whereby stress concentration can be prevented.

In the vehicle cover member according to the present disclosure, the vehicle cover member may be attached to the vehicle lower side of a floor panel so as to extend across an open portion under a floor tunnel. The floor tunnel is a groove-shaped cross-sectional portion that is convex in the vehicle upward direction and provided in the center portion of the floor panel of the vehicle in the vehicle width direction so as to extend in the vehicle front-and-rear direction.

Thus, it is possible to cover the open portion under the floor tunnel effectively and protect, for example, an exhaust pipe located in the floor tunnel from interference with the road surface in an effective way.

The present disclosure can provide a vehicle cover member that can diffuse inputs from the outside surface and prevent stress concentration.

BRIEF DESCRIPTION OF DRAWINGS

An embodiment of the present disclosure will be described based on the following figures, wherein.

DESCRIPTION OF EMBODIMENTS

Hereinafter, a vehicle cover member 100 according to an embodiment be described with reference to the drawings. Although, in the following description, the vehicle cover member 100 is described as being attached to the underside of the floor of a vehicle 10, this is not limiting, and the vehicle cover member 100 may be applied to cover other portions of the vehicle 10. In FIGS. 1 to 6, arrows "FR", "UP", and "RH" respectively represent the forward direction (traveling direction), the upward direction, and, the right direction of the vehicle 10. Also, the directions opposite to the arrows "FR", "UP" and "RH" respectively represent the rearward direction, the downward direction, and the left direction of the vehicle. Hereinafter, when the description is given simply using the front and rear, right and left, and up and down directions, unless otherwise specified they respectively represent front and rear in the vehicle front-and-rear direction, right and left in the vehicle right-and-left direction (vehicle width direction), and up and down in the vehicle up-and-down direction.

Figure 1:
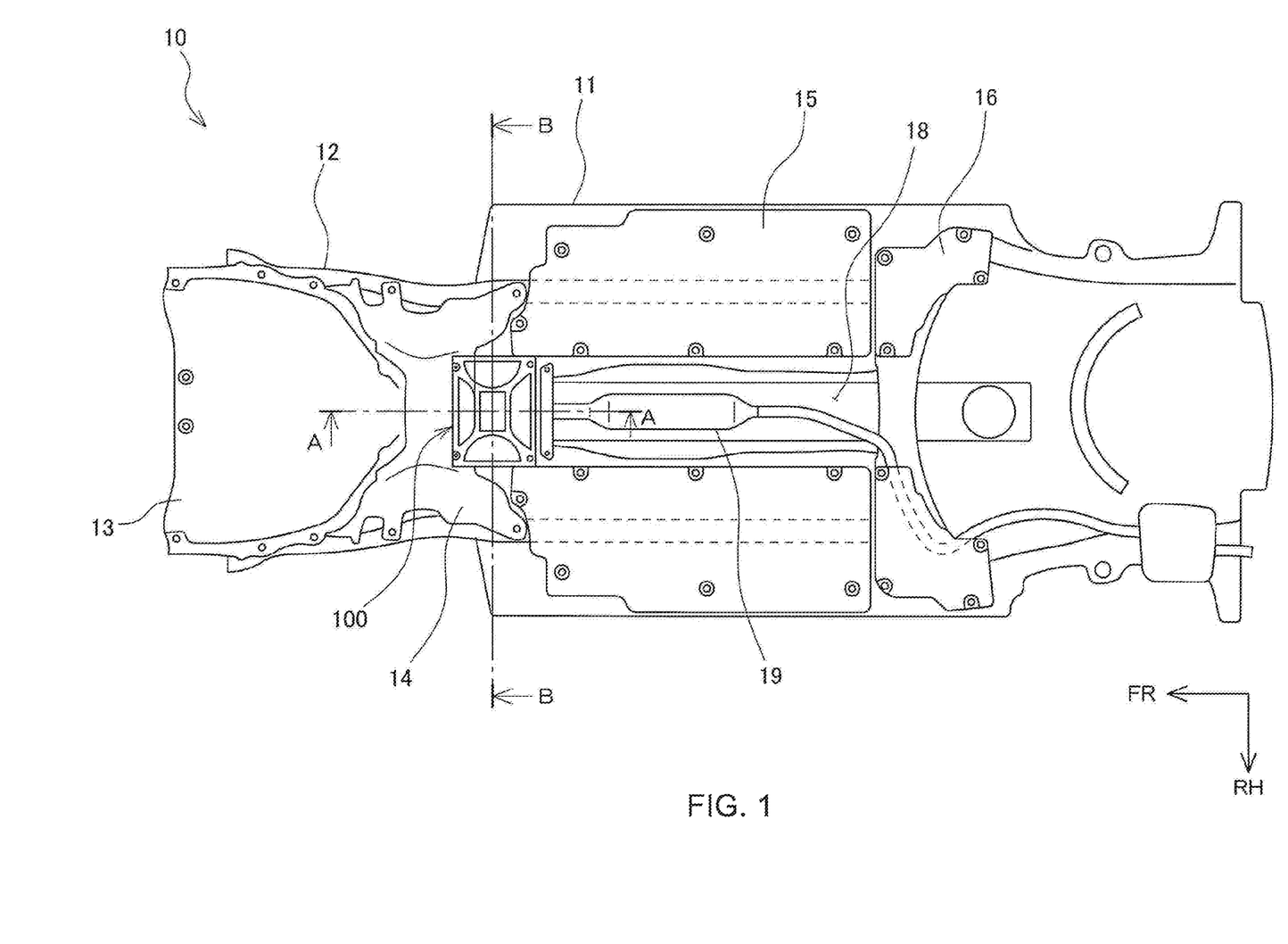
FIG. 1 is a plane view of the floor of a vehicle to which a vehicle cover member according to an embodiment is attached, as viewed from the underside of the vehicle.

First, with reference to FIG. 1, a brief description will be given on a structure of the vehicle 10 to which the vehicle cover member 100 is attached. FIG. 1 is a plane view of the floor of the vehicle 10 as viewed from the underside of the vehicle.

The vehicle 10 has right and left front side members 12 which are skeleton members disposed on the front side of the vehicle and extending in the vehicle front-and-rear direction, and a floor panel 11 constituting the floor of a vehicle chamber. An engine (not shown) is installed on the right and left front side members 12, and an undercover 13 is attached under the engine. In addition, a front suspension member 14 to which a suspension system of the vehicle 10 is connected is attached under the right and left front side members 12. The center portion of the floor panel 11 in the vehicle width direction has a floor funnel 18 that is a groove-shaped cross-sectional portion that is convex in the vehicle upward direction and extends in the vehicle front-and-rear direction. The floor tunnel 18 houses an exhaust pipe 19 in its groove. Floor undercovers 15 and rear undercovers 16 are also attached to the underside of the floor panel 11.

The vehicle cover member 100 is attached to the vehicle lower side of the floor panel 11 so as to extend across an open portion under the floor tunnel 18 such that front ends of the vehicle cover member 100 are fastened to the underside of the front suspension member 14, and rear ends are fastened to brackets 18a (see FIG. 4) rising on respective sides of the floor tunnel 18.

Figure 2:
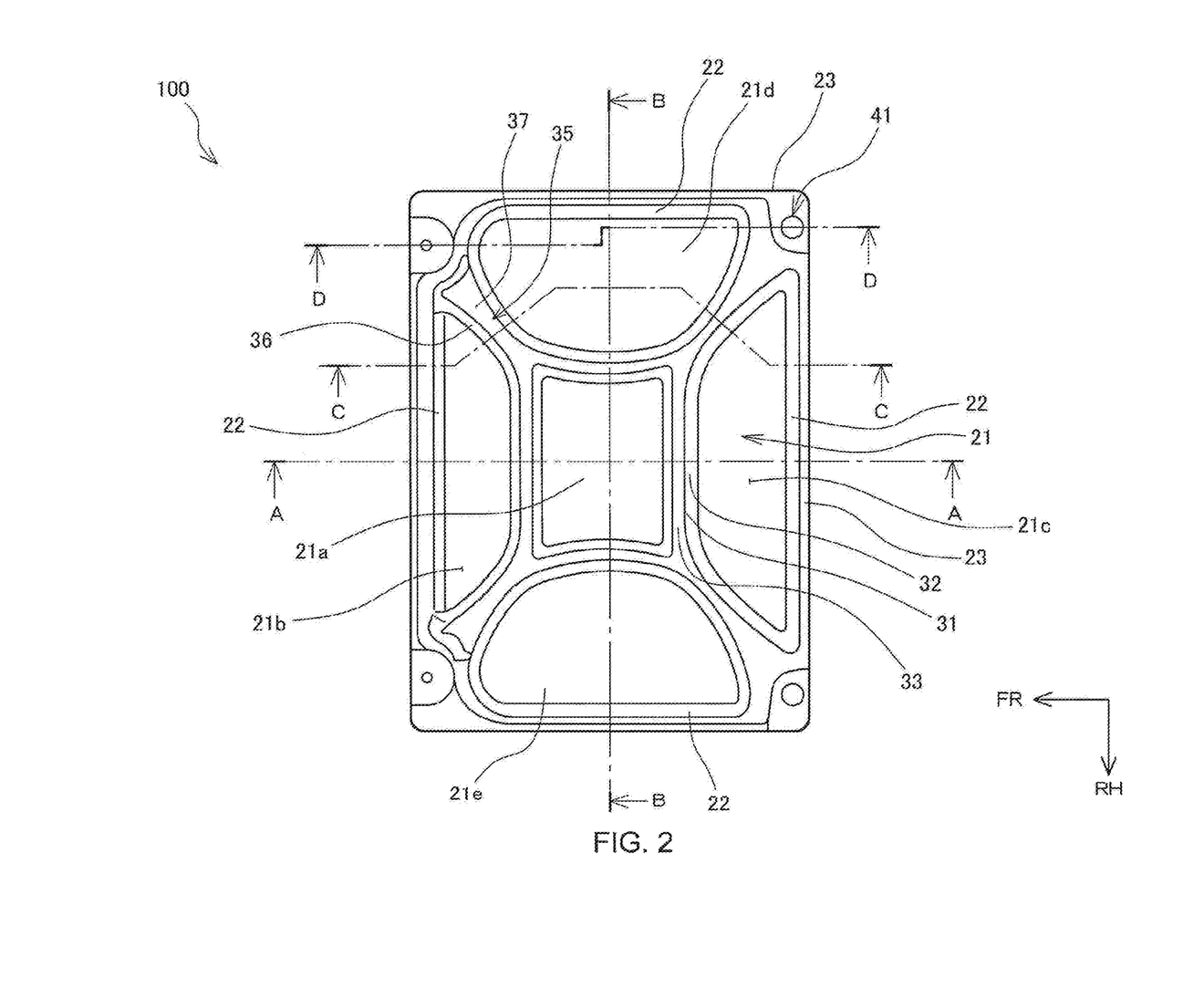
FIG. 2 is an enlarged plane view of the vehicle cover member according to the embodiment.

As shown in FIG. 2, the vehicle cooper member 100 is a tray-like member having a flat bottom plate 21, an edge wall 22 rising from a peripheral edge of the bottom plate 21, and a flange 23 connected to an upper end portion of the edge wall 22 and provided with a plurality of fastening portions 41 to be fastened to the vehicle 10. The bottom plate 21 has an annular groove 31 formed in an intermediate portion between the peripheral edge and the center, and a plurality of radial grooves 35 formed to extend radially from the annular groove 31 toward the fastening portions 41.

Accordingly, as shown in FIG. 2, the flat bottom plate 21 is partitioned into five portions: a center portion 21a surrounded by the annular groove 31; a front portion 21b delimited by the right and left radial grooves 35 and the annular groove 31 behind; a rear portion 21c delimited by the right and left radial grooves 35 and the annular groove 31 ahead; and a left portion 21d and a right portion 21e delimited by the upper and lower radial grooves 35 and the annular groove 31 on the center side. The outer periphery side of these front, rear, right and left portions 21b to 21e is formed of the edge wall 22.

In the vehicle cover member 100 according to the embodiment, the peripheral shape of the bottom plate 21 and the peripheral shape of the flange 23 are quadrangles, and the fastening portions 41 are arranged at the four corners of the flange 23. The radial grooves 35 respectively extend radially from the corners of the annular groove 31 toward the four corners of the flange 23.

Figure 3:
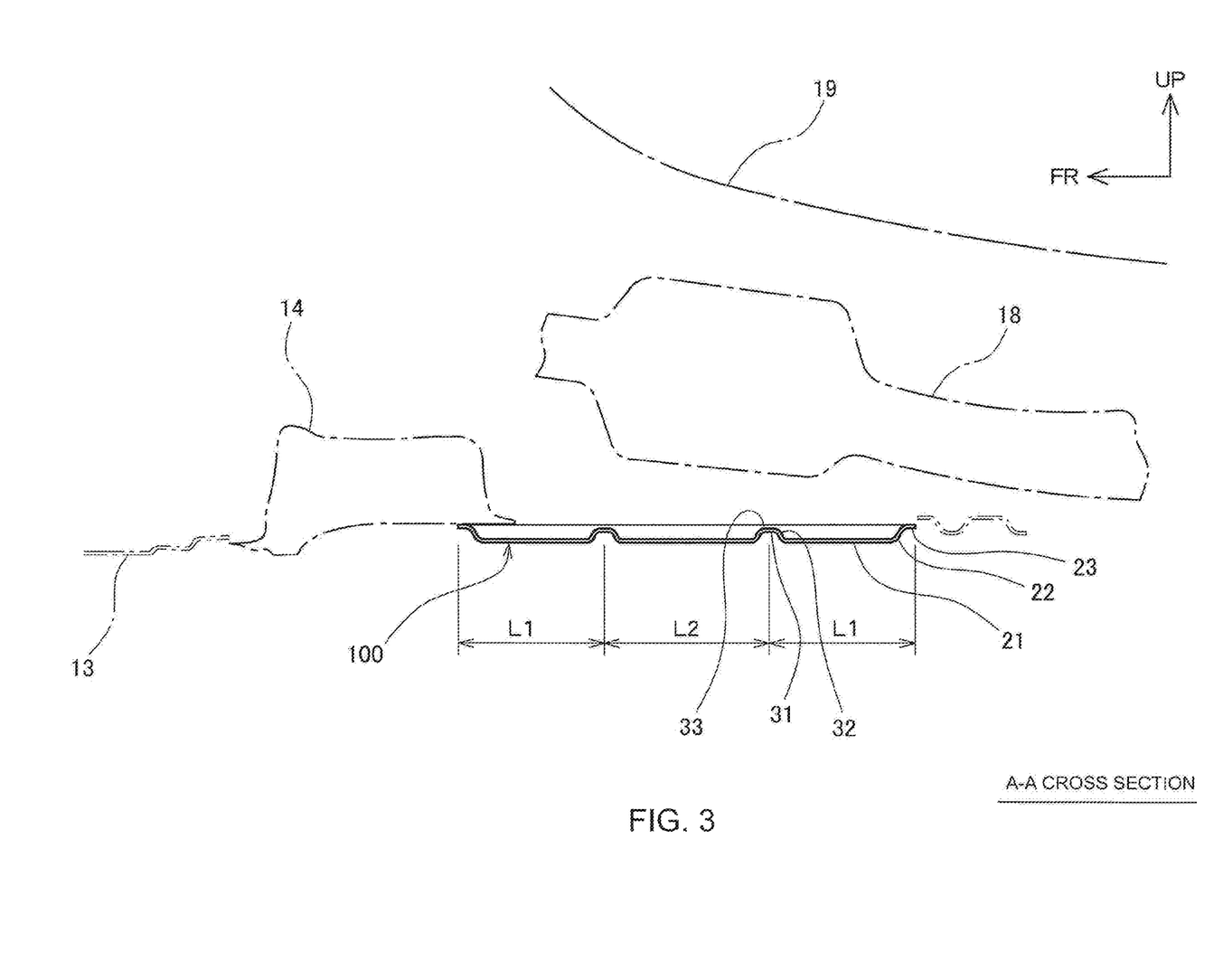
FIG. 3 is a cross-sectional view of the vehicle cover member according to the embodiment taken along lime A-A of FIGS. 1 and 2.
Figure 4:
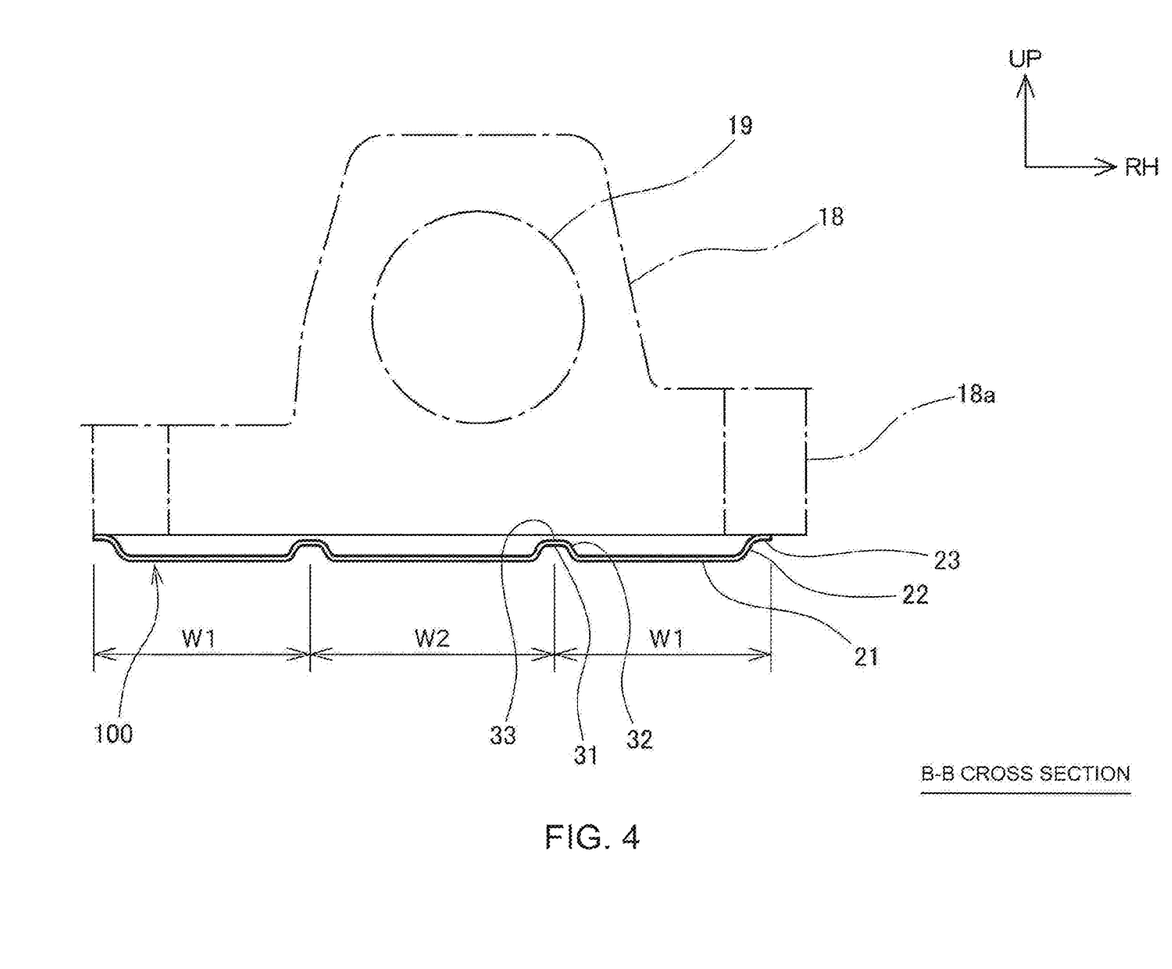
FIG. 4 is a cross sectional view of the vehicle cover member according to the embodiment taken along line B-B of FIGS. 1 and 2.
Figure 5:
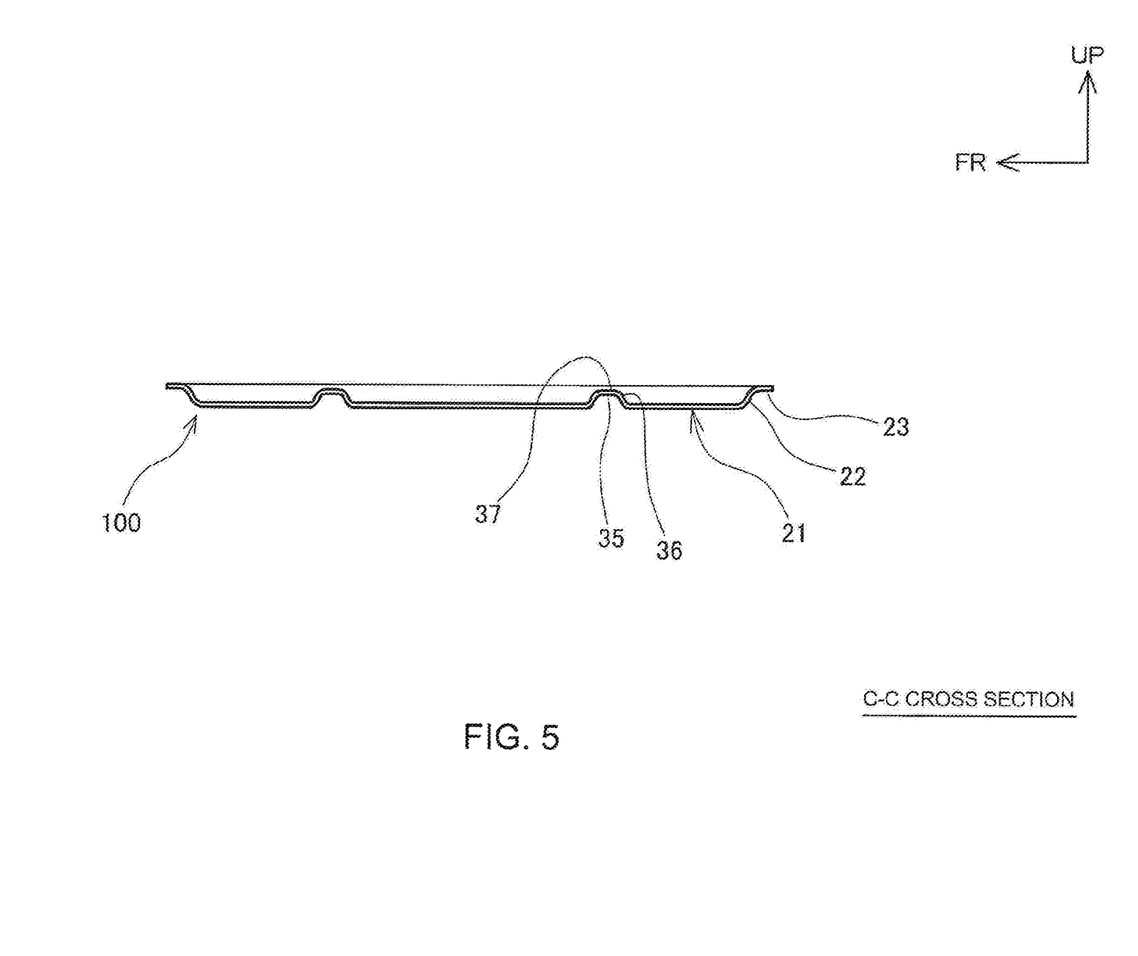
FIG. 5 is a cross-sectional view of the vehicle cover member according to the embodiment taken along line C-C of FIG. 2.

As shown in FIGS. 3 to 5, the annular groove 31 and the radial grooves 35 have a groove-shaped cross-sectional shape recessed upward from the undersurface of the bottom plate 21. The annular groove 3 and the radial grooves 35 have sidewalls 32 and 36, respectively and bottom walls 33 and 37, respectively. The side wall 36 of the radial groove 35 is connected to the side wall 32 of the annular groove 31 and the fastening portion 41 of the flange 23. The side wall 36 is also connected to the edge wall 22 on the outer periphery side of the front, rear, right, and left portions 21b to 21e. The bottom wall 37 of the radial groove 35 is connected to the bottom wall 33 of the annular groove 31 and the fastening portion 41 of the flange 23.

Figure 6:
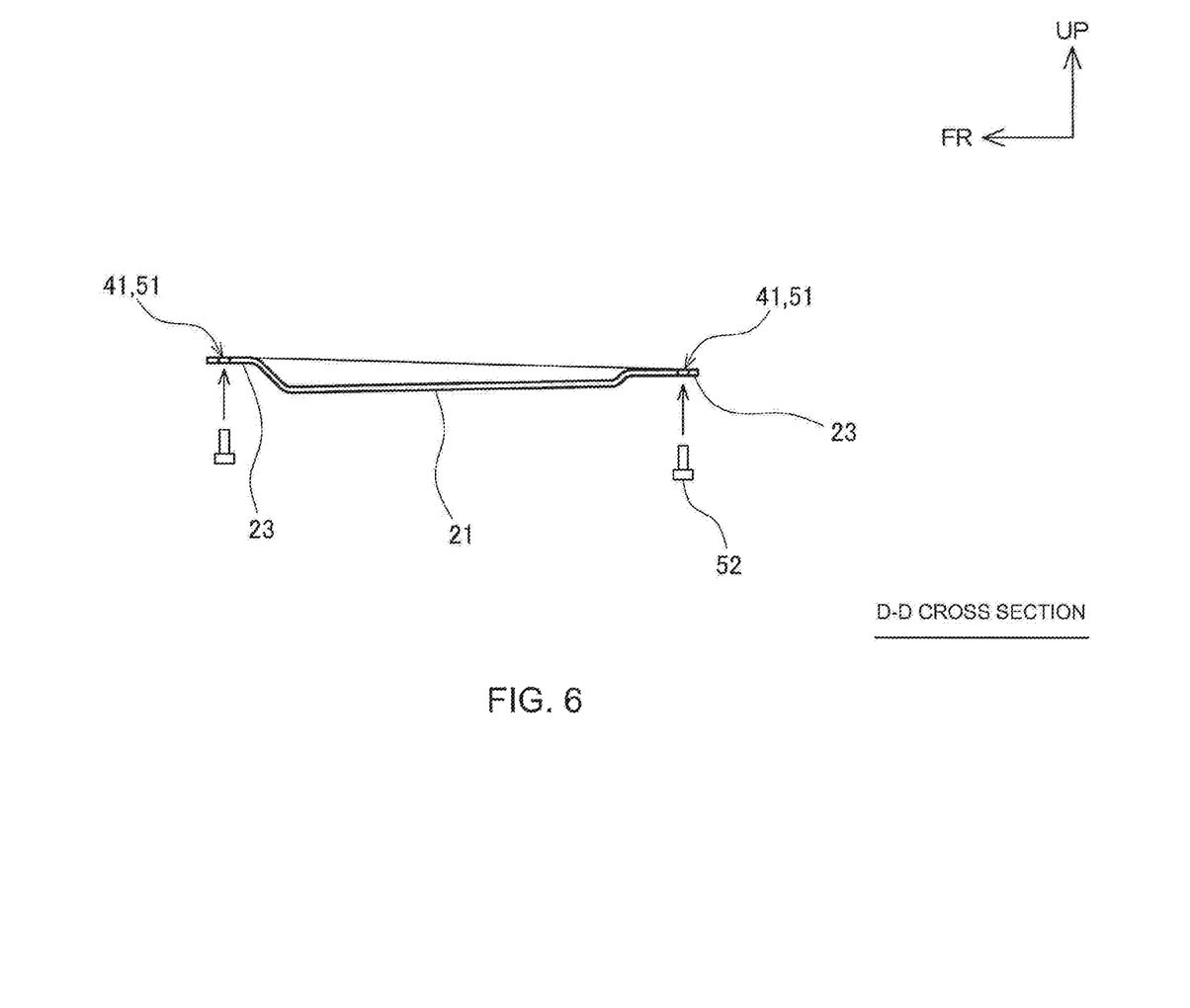
FIG. 6 is a cross-sectional vie w of the vehicle cover member according to the embodiment taken along line D-D of FIG. 2.

As such, the radial grooves 35, the annular groove 31, and the fastening portions 41 of the flange 23 are connected to thereby form an integrated body structure. In addition, as shown in FIG. 6, the vehicle cover member 100 is attached to the underside of the floor of the vehicle 10 by inserting bolts 52 into bolt holes 51 provided n the fastening portions 41 of the flange 23.

Further, as shown in FIG. 3, a length L1 in the longitudinal direction between a side end of the bottom plate 21 in the longitudinal direction and the annular groove 31 is equal to a length L2 in the longitudinal direction between the annular grooves 31 of the bottom plate 21. Further, as shown in FIG. 4, a length W1 in the width direction between a side end of the bottom plate 21 in the width direction and the annular groove 31 is equal to a length W2 in the width direction between the annular grooves 31 of the bottom plate 21. As such, the flange 23 around the periphery and the annular groove 31 are arranged substantially uniformly in the vehicle front-and-rear direction and in the vehicle width, direction.

As described above, in the vehicle cover member 100 according to the embodiment, the radial grooves 35, the annular groove 31, and the fastening portions 41 of the flange 23 are connected to thereby form an integrated body structure. Therefore if the vehicle receives inputs from the outside surface, the inputs are allowed to flow smoothly from the annular groove 31 and the radial grooves 35 to the fastening portions 41 of the flange 23, whereby stress concentration can be prevented. In addition, the flange 23 around the periphery and the annular groove 31 are arranged substantially uniformly in the vehicle front-and-rear direction and in the vehicle width direction, thererfore, if the vehicle receives, inputs from the outside surface, the inputs can be diffused more effectively, whereby stress concentration can be prevented.

Although the vehicle cover member 100 according to the embodiment has been described as a quadrangle, this is not limiting, and the vehicle cover member 100 may be another polygon, such as a triangle, pentagon, or hexagon. In this case, the vehicle cover member 100 may be formed such that the peripheral shape of the bottom plate 21 and the peripheral shape of the flange 23 are polygons, the fastening portions 41 are provided at the corners of the flange 23, the planar shape of the annular groove 31 is a polygon analogous to the bottom plate 21, the corners of the annular groove 31 are arranged to face the corners of the bottom plate 21, and that the radial grooves 35 are formed to respectively extend radially from the corners of the annular groove 31 toward the corners of the flange 23 at which the fastening portions 41 are provided.

In this case, again, the same effects as those of the above quadrangular vehicle cover member 100 can be obtained.

In addition, although, for the vehicle cover member 100 according to the embodiment described above, the annular groove 31 and the radial grooves 35 have been described as having a groove-shaped cross-sectional shape recessed upward from the undersurface of the bottom plate 21, this is not limiting, and the radial grooves 35 may have a groove-shaped cross-sectional shape projecting downward from the undersurface of the bottom plate 21. In this case, the annular groove 31 and the radial grooves 35 respectively have the sidewalls 32 and 36 and also respectively have the bottom walls 33 and 37 constituting convex surfaces projecting downward. The side wall 36 of the radial groove 35 is connected to the side wall 32 of the annular groove 31 and the fastening portion 41 of the flange 23. The bottom wall 37 of the radial groove 35 is connected to the bottom wall 33 of the annular groove 31 and the fastening portion 41 of the flange 23. In this case, the same effects as those of the vehicle cover member 100 according to the embodiment can be obtained.

The invention claimed is:

1. A tray-like vehicle cover member comprising:
   a flat bottom plate;
   an edge wall rising from a peripheral edge of the bottom plate; and
   a flange that is connected to an upper end portion of the edge wall and provided with a plurality of fastening portions to be fastened to a vehicle, wherein
   the bottom plate has
      an annular groove formed in an intermediate portion between the peripheral edge and a center, and
      a plurality of radial grooves formed to extend radially from the annular groove toward the fastening portions.

2. The vehicle cover member according to claim 1, wherein
   a peripheral shape of the bottom plate and the peripheral shape of the flange are polygons,
   the fastening portions are provided at corners of the flange,
   a plane shape of the annular groove is a polygon analogous to the bottom plate, and corners of the plane shape of the annular groove are arranged to face corners of the bottom plate, and
   the radial grooves respectively extend radially from the corners of the annular groove toward the corners of the flange at which the fastening portions are provided.

3. The vehicle cover member according to claim 2, wherein
   the peripheral shape of the bottom plate and the peripheral shape of the flange are quadrangles,
   the fastening portions are provided at four corners of the flange,
   the radial grooves respectively extend radially from the corners of the annular groove toward the four corners of the flange,
   a length in a width direction between a side end of the bottom plate in the width direction and the annular groove is equal to a length in the width direction between the annular grooves of the bottom plate, and
   a length in the longitudinal direction between a side end of the bottom plate in a longitudinal direction and the annular groove is equal to a length in the longitudinal direction between the annular grooves of the bottom plate.

4. The vehicle cover member according to claim 1, wherein
   the annular groove and the radial grooves have a groove-shaped cross-sectional shape recessed upward from an undersurface of the bottom plate, and
   a side wall of the radial groove is connected to a side wall of the annular groove and the fastening portion of the flange, and a bottom wall of the radial groove is connected to a bottom wall of the annular groove and the fastening portion of the flange.

5. The vehicle cover member according to claim 2, wherein
   the annular groove and the radial grooves have a groove-shaped cross-sectional shape recessed upward from an undersurface of the bottom plate, and
   a side wall of the radial groove is connected to a side wall of the annular groove and the fastening portion of the flange, and a bottom wall of the radial groove is connected to a bottom wall of the annular groove and the fastening portion of the flange.

6. The vehicle cover member according to claim 3, wherein
   the annular groove and the radial grooves have a groove-shaped cross-sectional shape recessed upward from an undersurface of the bottom plate, and
   a side wall of the radial groove is connected to a side wall of the annular groove and the fastening portion of the flange, and a bottom wall of the radial groove is connected to a bottom wall of the annular groove and the fastening portion of the flange.

7. The vehicle cover member according to claim 4, wherein
   the vehicle cover member is attached to the vehicle lower side of a floor panel so as to extend across an open portion under a floor tunnel, the floor tunnel being a groove-shaped cross-sectional portion that is convex in a vehicle upward direction and provided in a center portion of the floor panel of the vehicle in a vehicle width direction so as to extend in a vehicle front-and-rear direction.

8. The vehicle cover member according to claim 5, wherein
the vehicle cover member is attached to the vehicle lower side of a floor panel so as to extend across an open portion under a floor tunnel, the floor tunnel being a groove-shaped cross-sectional portion that is convex in a vehicle upward direction and provided in a center portion of the floor panel of the vehicle in a vehicle width direction so as to extend in a vehicle front-and-rear direction.

9. The vehicle cover member according to claim 6, wherein
the vehicle cover member is attached to the vehicle lower side of a floor panel so as to extend across an open portion under a floor tunnel, the floor tunnel being a groove-shaped cross-sectional portion that is convex in a vehicle upward direction and provided in a center portion of the floor panel of the vehicle in the vehicle width direction so as to extend in a vehicle front-and-rear direction.

* * * * *